(12) United States Patent  
Fontaine (10) Patent No.: US 10,488,611 B2  
(45) Date of Patent: *Nov. 26, 2019

(54) DUAL DIRECTION FIBER OPTIC CASSETTE SYSTEM AND FIBER OPTIC CASSETTE

(71) Applicant: BELDEN CANADA INC., Saint-Laurent (CA)

(72) Inventor: Marc Fontaine, Les Cèdres (CA)

(73) Assignee: BELDEN CANADA INC., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,311

(22) Filed: Dec. 14, 2018

(65) Prior Publication Data

US 2019/0121045 A1   Apr. 25, 2019

Related U.S. Application Data

(63) Continuation of application No. 15/643,586, filed on Jul. 7, 2017, now Pat. No. 10,185,108.

(60) Provisional application No. 62/359,784, filed on Jul. 8, 2016.

(51) Int. Cl.
  *G02B 6/44* (2006.01)

(52) U.S. Cl.
  CPC ......... *G02B 6/4452* (2013.01); *G02B 6/4455* (2013.01)

(58) Field of Classification Search
  CPC .. G02B 6/3897; G02B 6/4439; G02B 6/4452; G02B 6/4453; G02B 6/4454; G02B 6/4455

USPC .................. 385/134, 135; 361/725, 726, 727
See application file for complete search history.

(56) References Cited

U.S. PATENT DOCUMENTS

| | | | |
|---|---|---|---|
| 7,961,999 B2 | 6/2011 | Frohlich et al. | |
| 9,519,118 B2 | 12/2016 | Giraud et al. | |
| 9,810,869 B2 | 11/2017 | Campbell et al. | |
| 9,933,588 B2* | 4/2018 | Woodward | G02B 6/4452 |
| 2009/0269019 A1 | 10/2009 | Andrus et al. | |
| 2010/0322583 A1* | 12/2010 | Cooke | G02B 6/4452 |
| | | | 385/135 |
| 2011/0317974 A1 | 12/2011 | Krampotich et al. | |
| 2013/0089292 A1 | 4/2013 | Ott et al. | |
| 2014/0003782 A1 | 1/2014 | Blackwell et al. | |
| 2014/0248028 A1* | 9/2014 | Campbell | G02B 6/4452 |
| | | | 385/135 |
| 2015/0268436 A1 | 9/2015 | Blackwell et al. | |

* cited by examiner

*Primary Examiner* — Robert Tavlykaev
(74) *Attorney, Agent, or Firm* — Hugh Mansfield (57) ABSTRACT

An optic fiber system for mounting in a rack, cassette and front plate are disclosed. A fiber optic cassette receives a pair of opposed rails on opposite inner surfaces of a housing. Catches on the fiber optic cassette comprise biased tabs which engage grooves within the rails thereby releasable securing the cassette into the housing. Catches may be provided at both ends of the cassette allowing the cassette to be inserted from either end of the housing. The cassette comprises removeable front plate which is secured to it using a snap fit. The removeable plate can be used either with the cassette or as a standalone within the housing.

18 Claims, 6 Drawing Sheets

Fig-4

US 10,488,611 B2

DUAL DIRECTION FIBER OPTIC CASSETTE SYSTEM AND FIBER OPTIC CASSETTE

CROSS REFERENCE TO RELATED APPLICATIONS

This application is a Continuation application of U.S. patent application Ser. No. 15/643,586 filed on Jul. 7, 2017, which itself claims benefit of U.S. provisional application Ser. No. 62/359,784 filed on Jul. 8, 2016. All document above are incorporated herein in their entirety by reference.

FIELD OF THE INVENTION

The present invention relates to a dual direction cassette system with a removable standalone plate.

BACKGROUND TO THE INVENTION

The prior art disclose fiber optic cassette systems wherein the cassettes are insertable into a rack mounted housing from only one side of the housing. In particular in data centres, technicians often work both in front and behind racks. What is need therefore, and an object of the present invention, is a system where the cassette can be inserted, secured and removed from both the front and the back of the housing.

SUMMARY OF THE INVENTION

In order to address the above and other drawbacks there is provided an optic fiber system for mounting in a rack. The system comprises a housing defining a first opening at a first end and a second opening at a second end and comprising a first inner surface and a second inner surface, a plurality of first rails arranged in parallel along the first inner surface between the first opening and the second opening and a plurality of second rails arranged in parallel along the second inner surface between the first opening and the second opening, one of each of the first rails arranged opposite a respective one of the second rails and wherein at least one of the first rails and the second rails comprises a rail groove running along a length thereof, and at least one elongate fiber optic cassette comprising a long first edge and a long second edge, the first edge comprising a first rail receiving slot and the second edge comprising a second rail receiving slot, the cassette further comprising at least two catches, each of the catches comprising a rail groove engaging tab and a flexible actuator, wherein a first of the catches is positioned towards a first end of one of the first rail receiving slot and the second rail receiving slot and a second of the catches is positioned towards a second end of one of the first rail receiving slot and the second rail receiving slot. The at least one cassette is insertable into the housing from either the first end or the second end by positioning a short edge of the cassette adjacent a respective first and second rail pair and sliding the first rail receiving slot in a sliding direction over the respective first rail and the second rail slot over the second rail until the tabs are biased into their respective rail grooves and an engaging surface of each of the tabs of the catches abuts against their respective ends of their respective rail groove.

There is also provided an optic fiber dual direction cassette for use with a rack mounted case comprising a housing defining a first opening at a first end and a second opening at a second end and comprising a first inner surface and a second inner surface and a plurality of first rails arranged in parallel along the first inner surface between the first opening and the second opening and a plurality of second rails arranged in parallel along the second inner surface between the first opening and the second opening, one of each of the first rails arranged opposite a respective one of the second rails and wherein at least one of the first rails and the second rails comprises a rail groove running along a length thereof. The cassette comprises an elongate housing comprising a long first edge and a long second edge, a first rail receiving slot in the long first edge, a second rail receiving slot in the long second edge, at least two catches each comprising a rail groove engaging tab and a flexible actuator, a first of the catches is positioned towards a first end of one of the first rail receiving slot and the second rail receiving slot, and a second of the catches is positioned towards a second end of one of the first rail receiving slot and the second rail receiving slot. The cassette is insertable into the housing from either the first end or the second end by positioning a short edge of the cassette adjacent a respective first and second rail pair and sliding the first rail receiving slot in a sliding direction over the respective first rail and the second rail slot over the second rail until an engaging surface of each of the tabs of the catches is biased into their respective rail groove and abuts against their respective ends of their respective rail groove.

Additionally, there is provided a standalone front panel for a fiber optic cassette comprising a substantially rectangular elongate housing having a short end defining an elongate rectangular opening and comprising at least one flexible clip engaging structure at either end of the opening. The front panel comprises an elongate rectangular plate sized to fit over the short end and comprising a short edge at either end of the elongate rectangular plate, at least one pair of fiber optic connectors secured in the plate, and at least one flexible clip extended from each of the short edges and configured for engagement with a respective one of the flexible clip engaging structures.

DETAILED DESCRIPTION OF THE ILLUSTRATIVE EMBODIMENTS

Figure 1A:
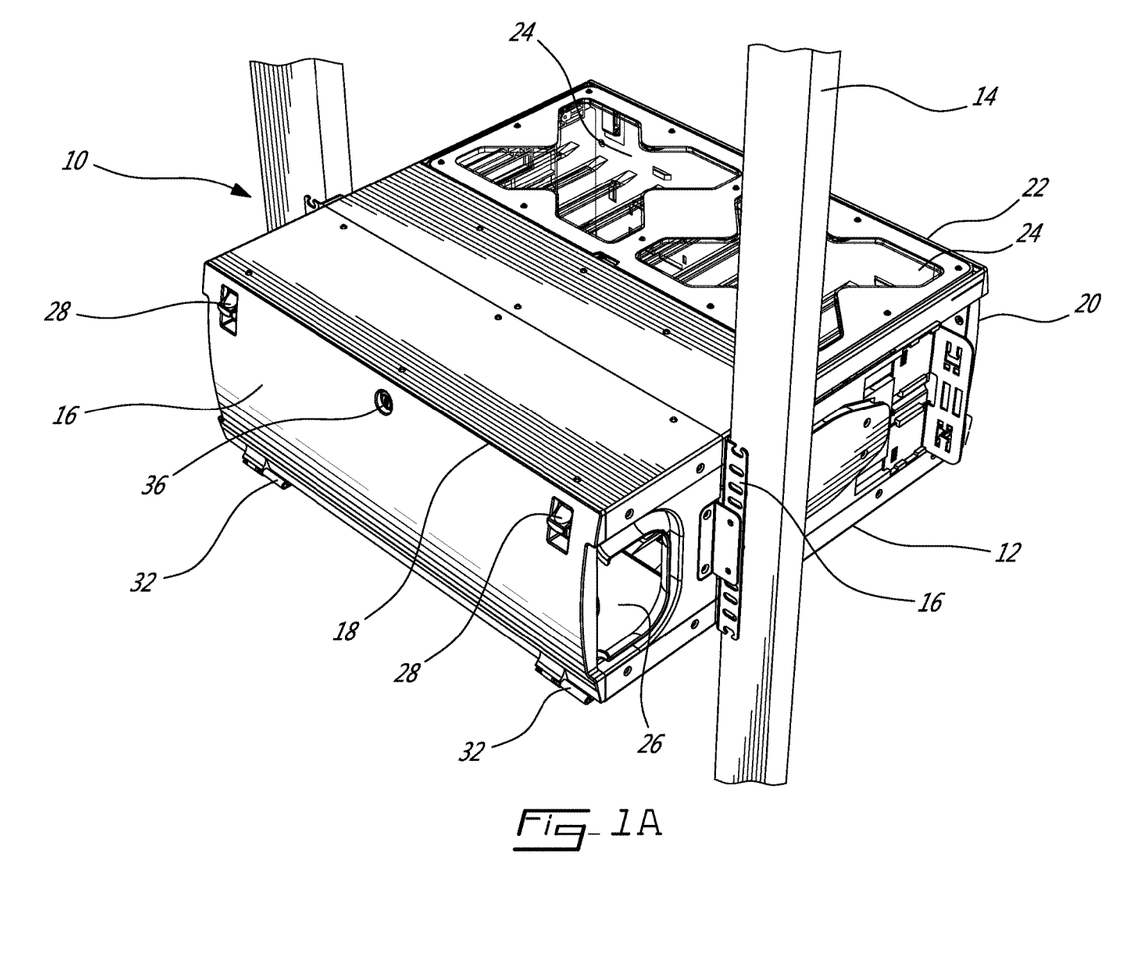
FIG. 1A provides raised right front perspective view of an optic fiber system mounted in a 19" rack and in accordance with an illustrative embodiment of the present invention.

Referring now to FIG. 1A, a dual direction fiber optic cassette system, generally referred to using the reference numeral 10, will now be described. The system comprises a housing 12, illustratively a 4 U compatible housing suitable for mounting to a 19" rack 14, for example through the use of brackets 16 or the like. The housing 12 comprises a first door 16 covering a first opening 18 and a second door 20 covering a second opening 22. Suitable for use within a data centre or the like, as will be discussed in more detail below the first opening 18 is typically only easily accessible to a user positioned in front of the housing 12 and the second opening 22 only easily accessible to a user positioned behind the housing 12. The housing 12 may further comprise cut outs 24 or the like and such that a user may partially view the interior of the housing 12 without opening one or other of the doors 16, 20. Cut away portions 26 are also typically provided and such that cables (not shown) may be fed into the housing 12 while maintaining the ability to close the door 16. Typically, such cut away portions 26 are occluded by a brush like structure (not shown) which limits the infiltration of dust and the like while allowing the cables to pass through freely.

Figure 1B:
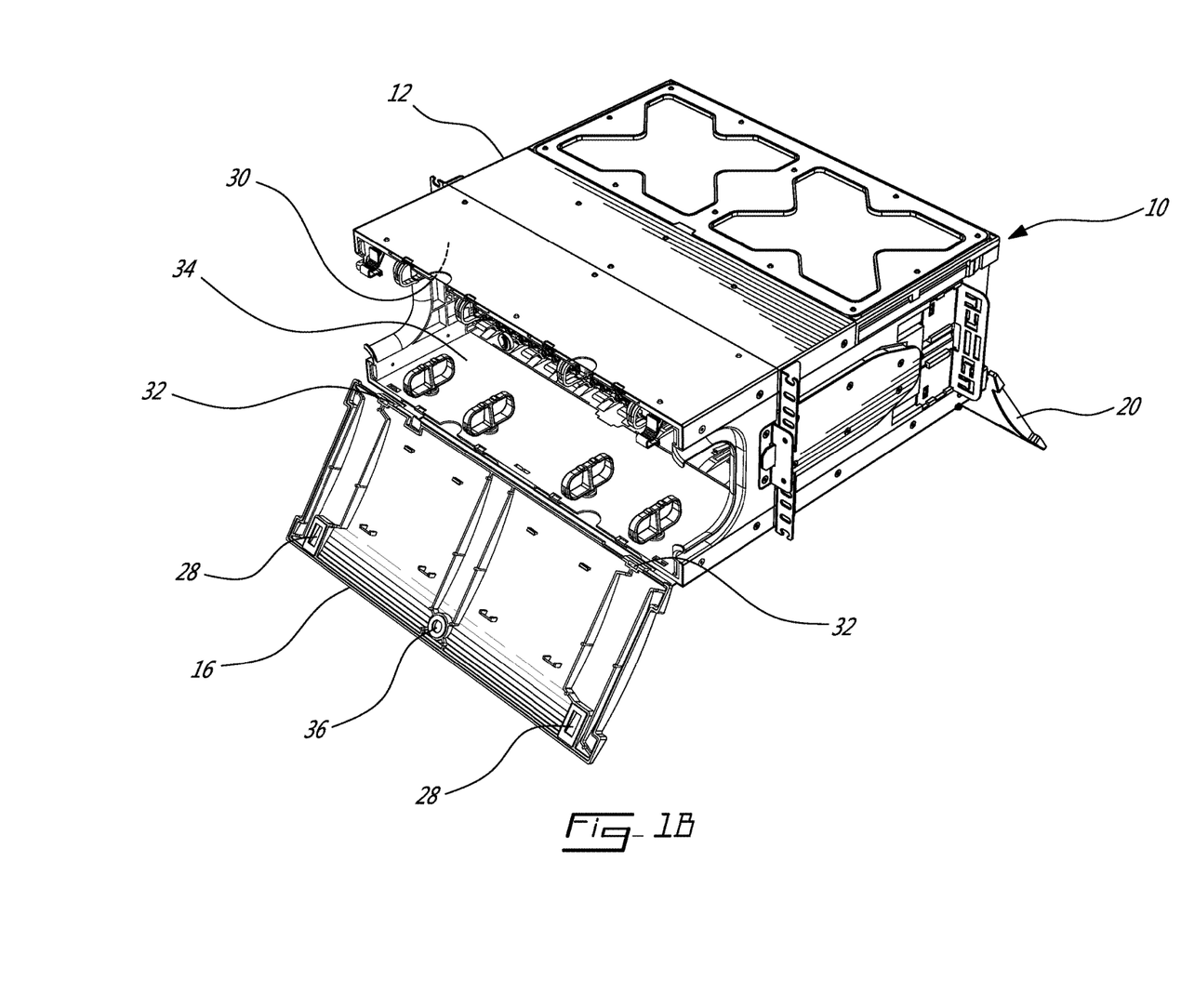
FIG. 1B provides raised right front perspective view of an optic fiber system with access doors open and in accordance with an illustrative embodiment of the present invention.

Referring to FIG. 1B in addition FIG. 1A, each door 16, 20 comprises user actuatable latches 28 which engage slots (not shown) on an upper inner surface 30 of the housing 12. Hinges 32 are provided between the lower inner surface 34 and each of the doors 16, 20 allowing a door 16, 20 to be opened and rotated out of the way when a user actuates respective ones of the latches 28. To provide additional security, a keyed lock 36 may also be provided.

Figure 2:
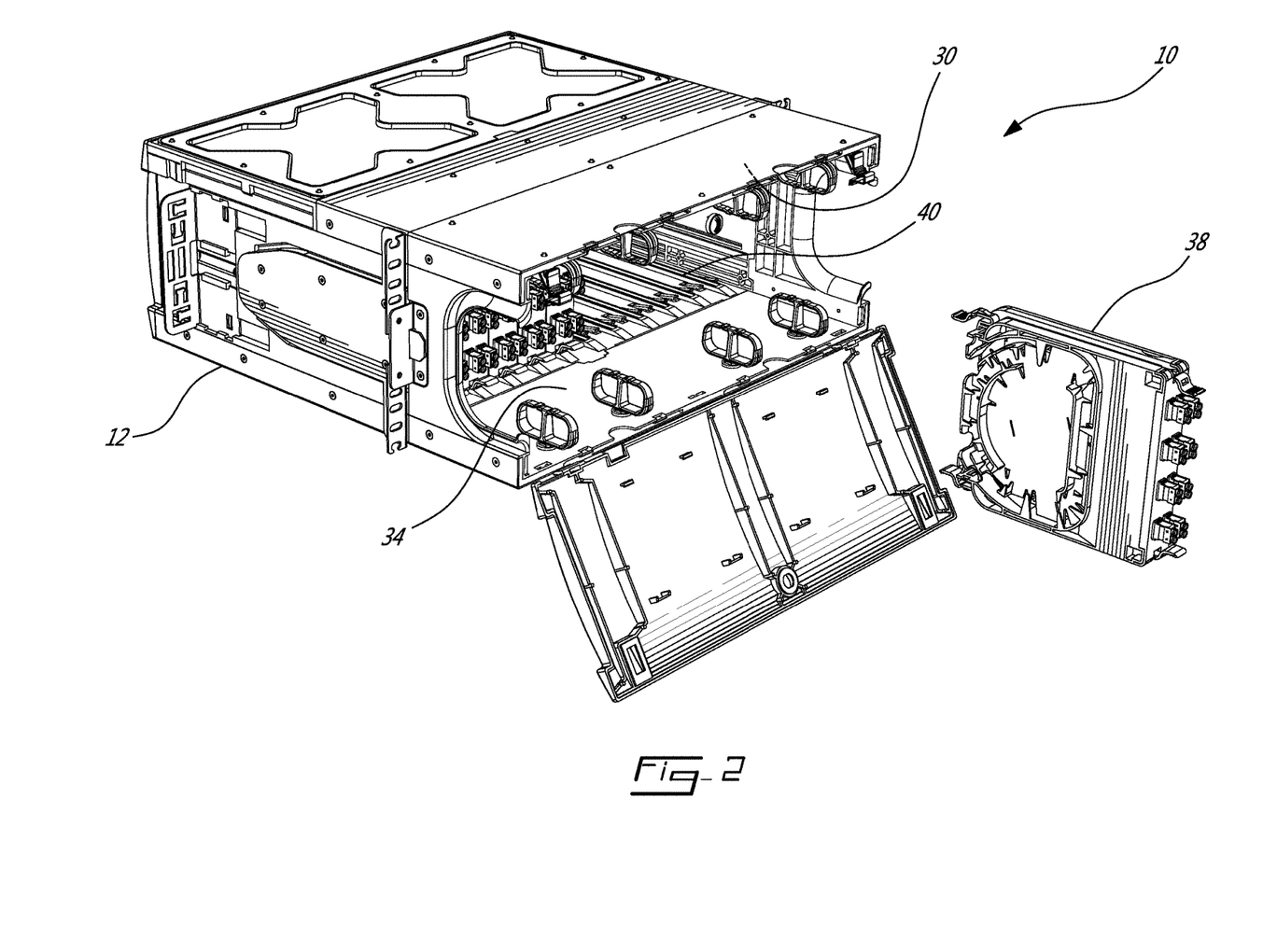
FIG. 2 provides left front perspective view of an optic fiber system with an optic fiber cassette removed and in accordance with an illustrative embodiment of the present invention.

Referring now to FIG. 2, the housing 12 is configured for accepting a plurality of fiber optic cassettes 38 which are each engaged on respective opposed pairs of a plurality of first and second rails 40 disposed along both the first (upper) inner surface 30 and the second (lower) inner surface 34 of the housing 12.

Figure 3:
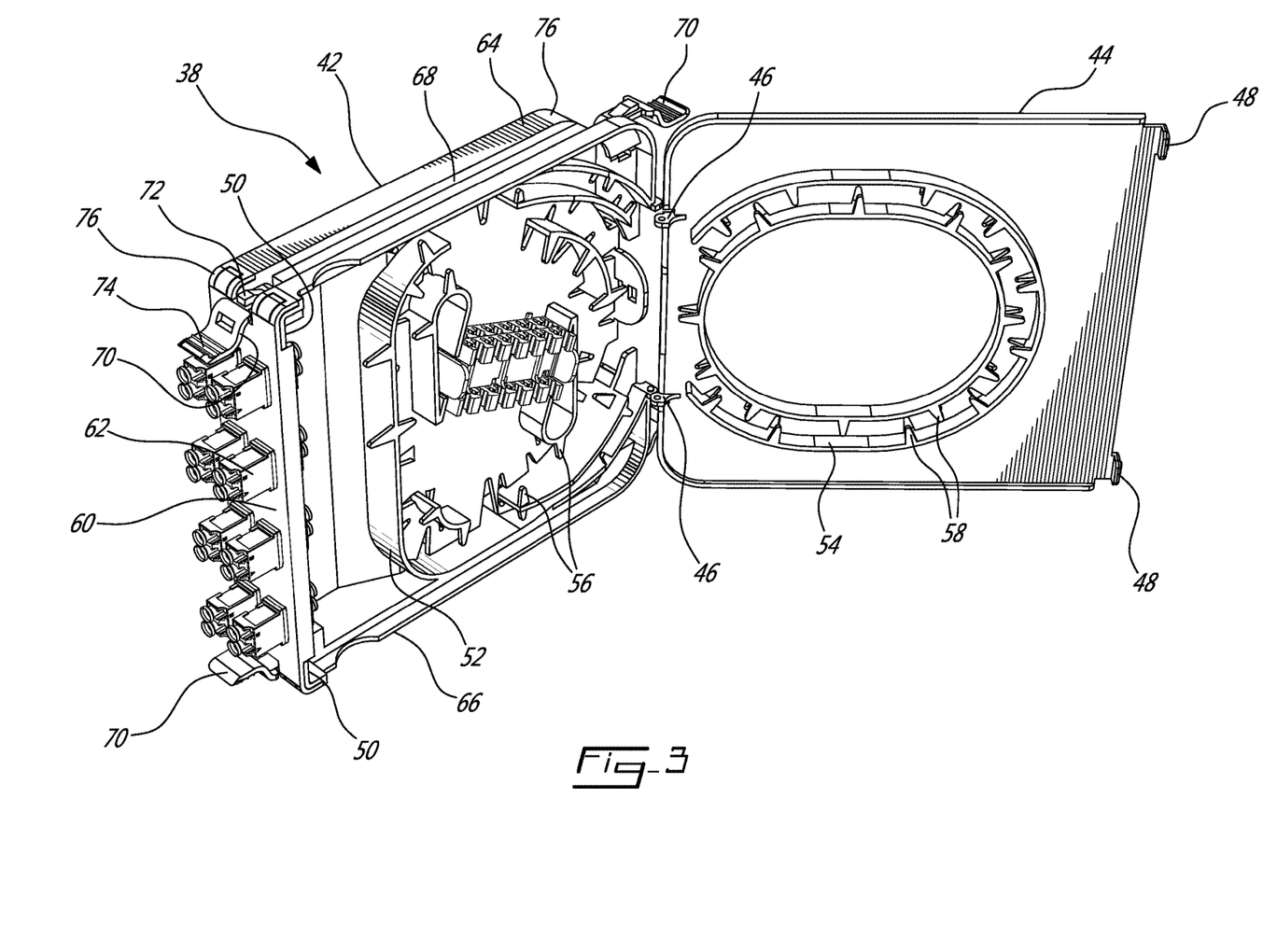
FIG. 3 provides raised right front perspective view of an optic fiber cassette in accordance with an illustrative embodiment of the present invention.

Referring now to FIG. 3, each cassette 38 comprises a cassette housing 42 and a typically transparent cassette door 44 mounted to the cassette housing 42 via a pair of hinges 46 and such that it can be moved between an open position as shown and a closed position. In this regard, the cassette door 44 comprises securing tabs 48 which engage with complementary slots 50 in the cassette housing 42 to retain the cassette door 44 in a closed position. The cassette housing 42 further comprises a first optic fiber receiving structure 52 about which lengths of optical fibers (not shown) can be wound. Similarly, the cassette door 44 comprises a second optic fiber receiving structure 54 also about which lengths of optical fibers can be wound. The first optic fiber receiving structure 52 and the second optic fiber receiving structure 54 allow a length of optic fiber to be wound in a serpentine fashion and such that a portion of the optic fiber is found on both the first optic fiber receiving structure 52 and the second optic fiber receiving structure 54. The first optic fiber receiving structure 52 comprises a first plurality of retaining tabs 56 which serve to retain the optic fibers within the first optic fiber receiving structure 52. Similarly, the second optic fiber receiving structure 54 comprises a second plurality of retaining tabs 58 which serve to retain the optic fibers within the second optic fiber receiving structure 54. The front plate 60 of the cassette 38 comprises a plurality of adaptors 62 for receiving a plurality of optic fiber connectors (not shown) terminating a plurality of optic fibers and such that such optic fibers may be interconnected with other optic fibers (also not shown) positioned within the cassette 38.

Still referring to FIG. 3, the cassette 38 further comprises a long top edge 64 and a long bottom edge 66 each comprising a rail receiving slot 68. A plurality of catches 70 are provided, one at each of end of each of the rail receiving slots 68, and each comprising a rail groove engaging tab 72 and a flexible actuator 74. The ends 76 of the long top edge 64 and the long bottom edge 66 are curved such that the cassette 38 is easily engageable with respective pairs of the rails 40.

Figure 4:
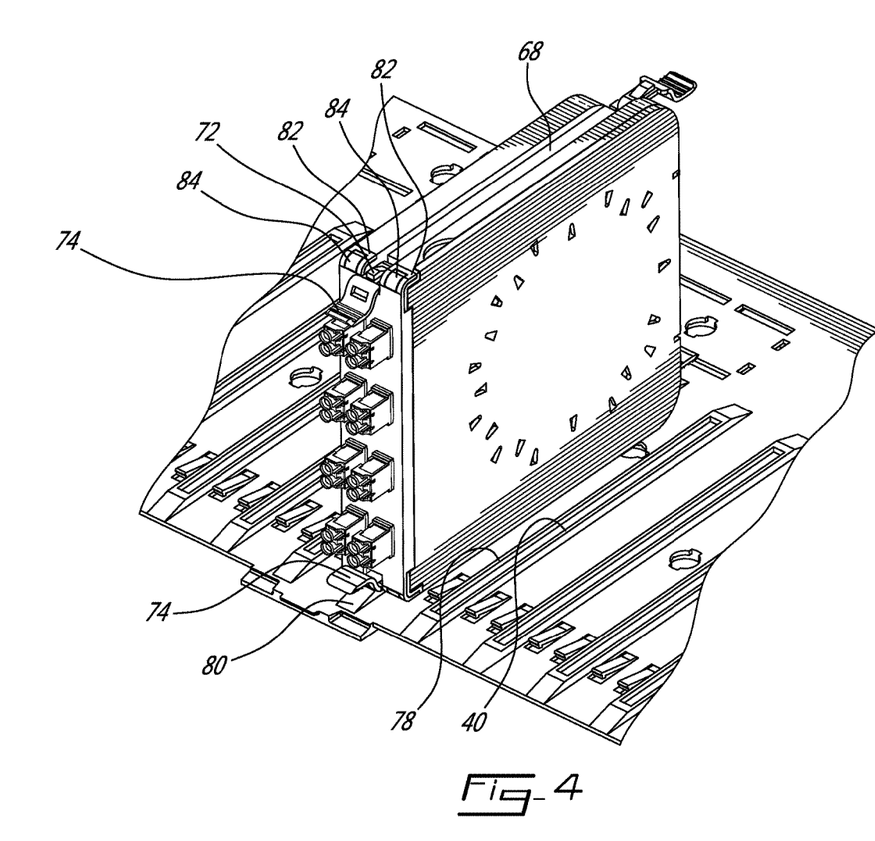
FIG. 4 provides raised right front perspective view of an optic fiber system installed on a rail and in accordance with an illustrative embodiment of the present invention.

Referring now to FIG. 4 in addition to FIG. 2, as the cassette 38 is slid into the housing 12 in a sliding direction, an opposed pair of rails 40 are engaged within the rail receiving slots 68. Illustratively, each rail 40 comprises a rail groove 78 along a length thereof. As the slots 68 are pushed onto their respective rails 40, a first of the rail groove engaging tabs 72 slides up a beveled end 80 of the rail groove 78 against the bias of the flexible actuator 74 and into the rail groove 78. The first of the rail groove engaging tabs 72 slides along the length of its respective rail groove 78 until it butts against the end of the groove 78. Similarly, a second of the rail groove engaging tabs 72 positioned at an opposite end of the slot 68 slides up a beveled end 80 of the rail groove 78 against the bias of the flexible actuator 74 and into the rail groove 78. At this point the cassette 38 is locked between a pair of rails 40 by the catches 70 and the tabs 72 which are biased into their respective rail grooves 78. A person of ordinary skill in the art will now understand that, in order to remove the cassette 38 from the housing 12, the rail groove engaging tabs 72 must be disengaged from their respective grooves 78. This is done by decreasing the distance between the pair of flexible actuators 74 located at one end of the cassette and pulling the cassette out of the housing 12. A person of ordinary skill in the art will now also understand that this can be done from in front of the housing 12 or behind the housing 12 and only in the direction of the catches 70 being actuated.

Figure 5A:
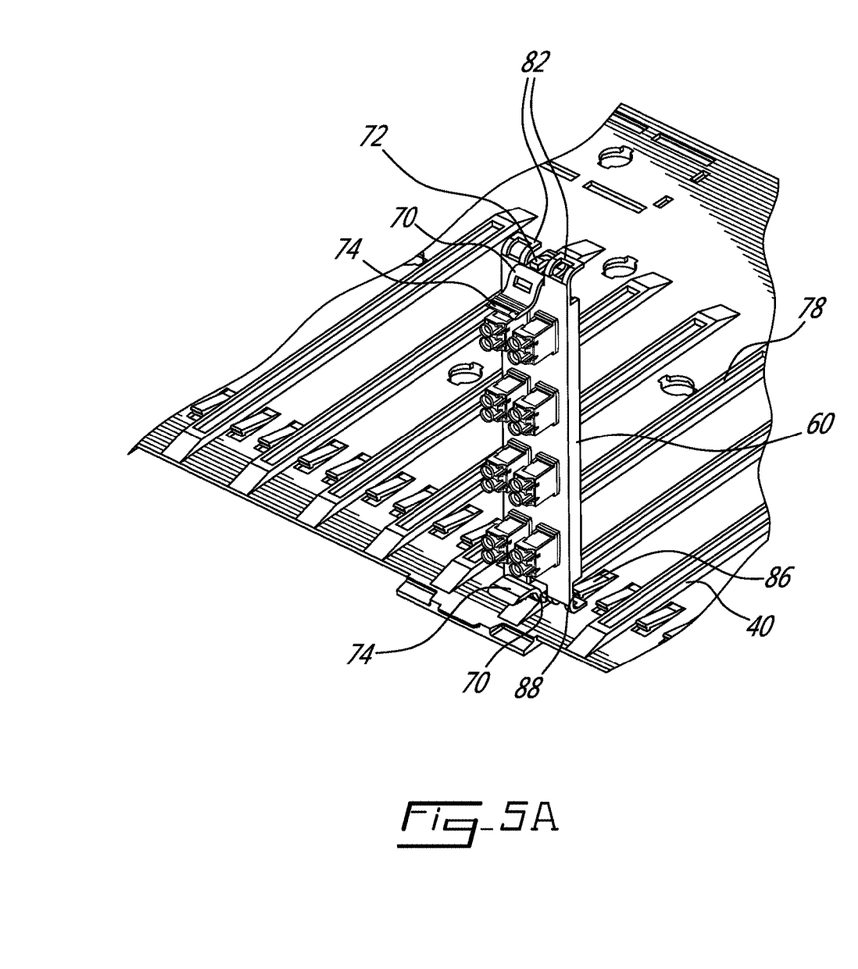
FIGS. 5A and 5B provide respectively a raised right front perspective view and a partial rear perspective view of a removable cover plate of an optic fiber cassette installed on a rail and in accordance with an illustrative embodiment of the present invention.
Figure 5B:
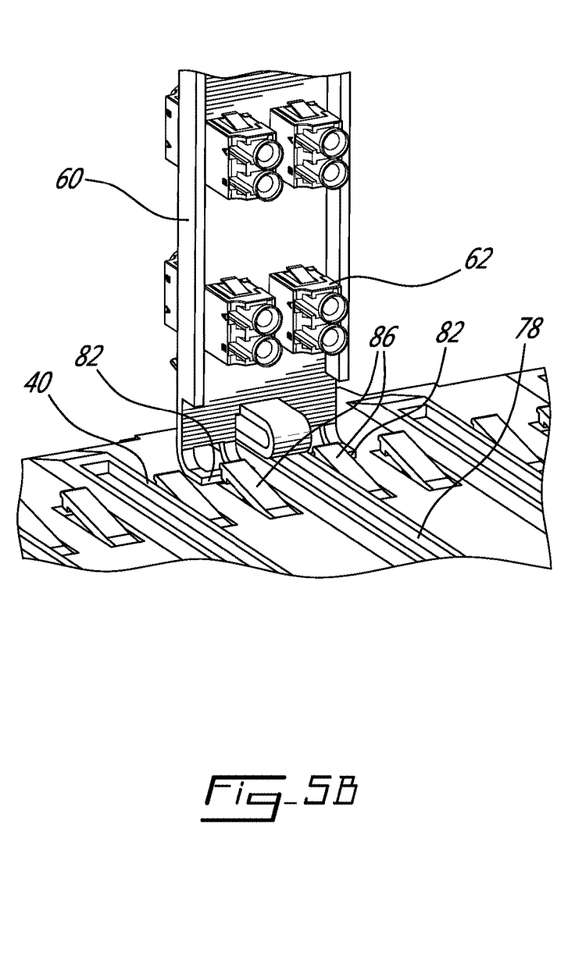

Referring to FIGS. 5A and 5B in addition to FIG. 4, the front plate 60 is removeably snap fit to the cassette 38 and may also be used in a standalone mode. In this regard, the front plate 60 comprises a pair of flexible clips 82 at each end which define a rail receiving aperture therebetween and engage with corresponding bosses 84 moulded into the cassette housing 12. Once removed from the cassette 38, the front plate 60 may be slid between the rails 40 with a rail positioned between a respective pair of the flexible clips 82 and until the ends of the flexible clips 82 are engaged by respective ones of pairs of flexible stops 86 while the tabs 72 of the catches 70, which are biased into the rail grooves 78 are engaged in their respective rail grooves 78. The cover plate 60 is thus held securely between the upper and lower rails 40. The ends of the flexible stops 86 are moulded to form a flexible clip engaging ledge 88 which serves to better secure the front plate 60. The stand-alone front plate 60 can be removed by decreasing the distance between the flexible actuators 74 and such that the tabs 72 are flexed out of their respective rail grooves 78. As discussed above, the front plate 60 can be equipped with, for example, a plurality of adaptors 62 for receiving fiber topic cables (not shown). Typically such adaptors are modular and received in apertures formed in the front plate 60.

Although the present invention has been described hereinabove by way of specific embodiments thereof, it can be modified, without departing from the spirit and nature of the subject invention as defined in the appended claims.

I claim:

1. An optic fiber system for mounting in a rack, comprising:
   a housing defining a first opening at a first end and a second opening at a second end and comprising a first inner surface and a second inner surface;

a plurality of first rails arranged in parallel along said first inner surface between said first opening and said second opening and a plurality of second rails arranged in parallel along said second inner surface between said first opening and said second opening, one of each of said first rails arranged opposite a respective one of said second rails and wherein at least one of said first rails and said second rails comprises a rail groove running along a length thereof and defining a direction extending between said first opening and said second opening; and at least one elongate fiber optic dual direction cassette comprising a front, a back and a first edge and a second edge, said first edge comprising a first rail receiving slot comprising a front end adjacent said front and a back end adjacent said back and said second edge comprising a second rail receiving slot comprising a front end adjacent said front and a back end adjacent said back, said cassette further comprising at least two catches, each of said catches comprising a rail groove engaging tab and a flexible actuator, wherein a first of said catches is positioned towards said front end of one of said first rail receiving slot and said second rail receiving slot and a second of said catches is positioned towards said back end of one of said first rail receiving slot and said second rail receiving slot;

wherein said at least one cassette is insertable into said housing from either said first end or said second end by positioning one of said front and said back adjacent a respective first and second rail pair and sliding said first rail receiving slot in a sliding direction over said respective first rail and said second rail slot over said second rail until said tabs are biased into their respective rail grooves and an engaging surface of each of said tabs of said catches abuts against their respective ends of their respective rail groove.

2. The optic fiber system of claim 1, wherein either end of each of said rails is bevelled.

3. The optic fiber system of claim 1, further comprising a first door hinged for rotation along a long edge of said first opening and said bottom inner surface and a second door hinged for rotation along a long edge of said second opening and said bottom inner surface.

4. The optic fiber system of claim 1, wherein said housing is mountable in a 19" rack.

5. The optic fiber system of claim 1, wherein said first inner surface is a top inner surface and said plurality of first rails are top rails and said second inner surface is a bottom surface and said plurality of second rails are bottom rails.

6. The optic fiber system of claim 1, wherein said catches are one of positioned towards respective ends of said first rail receiving slot and positioned towards respective ends of said second rail receiving slot.

7. The optic fiber system of claim 1, comprising two pairs of said catches, wherein each of a first pair of said catches is positioned towards a respective end of said first rail receiving slot and each of a second pair of said catches is positioned towards a respective end of said second rail receiving slot.

8. The optic fiber system of claim 1, wherein said respective ends of said rail grooves and said engaging surfaces are substantially flat and at right angles to said sliding direction and further wherein a surface of said tab opposite said engaging surface is bevelled.

9. The optic fiber system of claim 1, wherein said cassettes are reversible such that said at least one cassette is insertable into said housing by positioning one of said front and said back adjacent a respective first and second rail pair and sliding said second rail receiving slot over said respective first rail and said first rail slot over said second rail until said tabs of said catches abut against their respective ends of their respective rail groove.

10. An optic fiber dual direction cassette for use with a rack mounted case comprising a housing defining a first opening at a first end and a second opening at a second end and comprising a first inner surface and a second inner surface and a plurality of first rails arranged in parallel along the first inner surface between the first opening and the second opening and a plurality of second rails arranged in parallel along the second inner surface between the first opening and the second opening, one of each of the first rails arranged opposite a respective one of the second rails and wherein at least one of the first rails and the second rails comprises a rail groove running along a length thereof and defining a direction extending between the first opening and the second opening, the cassette comprising:

an elongate housing comprising a front, a back and a first edge and a second edge;

a first rail receiving slot in said first edge, said first rail comprising a front end adjacent said front and a back end adjacent said back;

a second rail receiving slot in said second edge, said second rail comprising a front end adjacent said front and a back end adjacent said back;

at least two catches each comprising a rail groove engaging tab and a flexible actuator;

a first of said catches is positioned towards said front end of one of said first rail receiving slot and said second rail receiving slot; and a second of said catches is positioned towards said back end of one of said first rail receiving slot and said second rail receiving slot;

wherein the cassette is insertable into the housing from either the first end or the second end by positioning one of said front and said back adjacent a respective first and second rail pair and sliding said first rail receiving slot in a sliding direction over the respective first rail and said second rail slot over the second rail until an engaging surface of each of said tabs of said catches is biased into their respective rail groove and abuts against their respective ends of their respective rail groove.

11. The optic fiber dual direction cassette of claim 10, wherein said catches are one of positioned towards opposite ends of said first rail receiving slot and positioned towards opposite ends of said second rail receiving slot.

12. The optic fiber dual direction cassette of claim 10, comprising two pairs of said catches, wherein each of a first pair of said catches is positioned towards opposite ends of said first rail receiving slot and each of a second pair of said catches is positioned towards opposite ends of said second rail receiving slot.

13. The optic fiber dual direction cassette of claim 10, wherein the respective ends of the rail grooves and said engaging surfaces are substantially flat and at right angles to said sliding direction and further wherein a surface of said tab opposite said engaging surface is bevelled.

14. The optic fiber dual direction cassette of claim 10, wherein said cassettes are reversible such that the cassette is insertable into the housing by positioning one of said front and said back adjacent a respective first and second rail pair and sliding said second rail receiving slot over said respective first rail and said first rail slot over said second rail until said tabs of said catches abut against their respective ends of their respective rail groove.

15. The optic fiber dual direction cassette of claim 10, wherein said housing further comprises a hinged door for accessing an interior of said housing.

16. The optic fiber dual direction cassette of claim 10, wherein said housing further comprises a front panel comprising at least one pair of fiber optic connectors.

17. The optic fiber dual direction cassette of claim 16, wherein said front panel is removeably secured to said housing using a snap fitting.

18. The optic fiber dual direction cassette of claim 16, wherein each of said at least one pair of fiber optic connectors terminates a respective end of a respective fiber optic cable held within said cassette.

* * * * *